Figure 1:
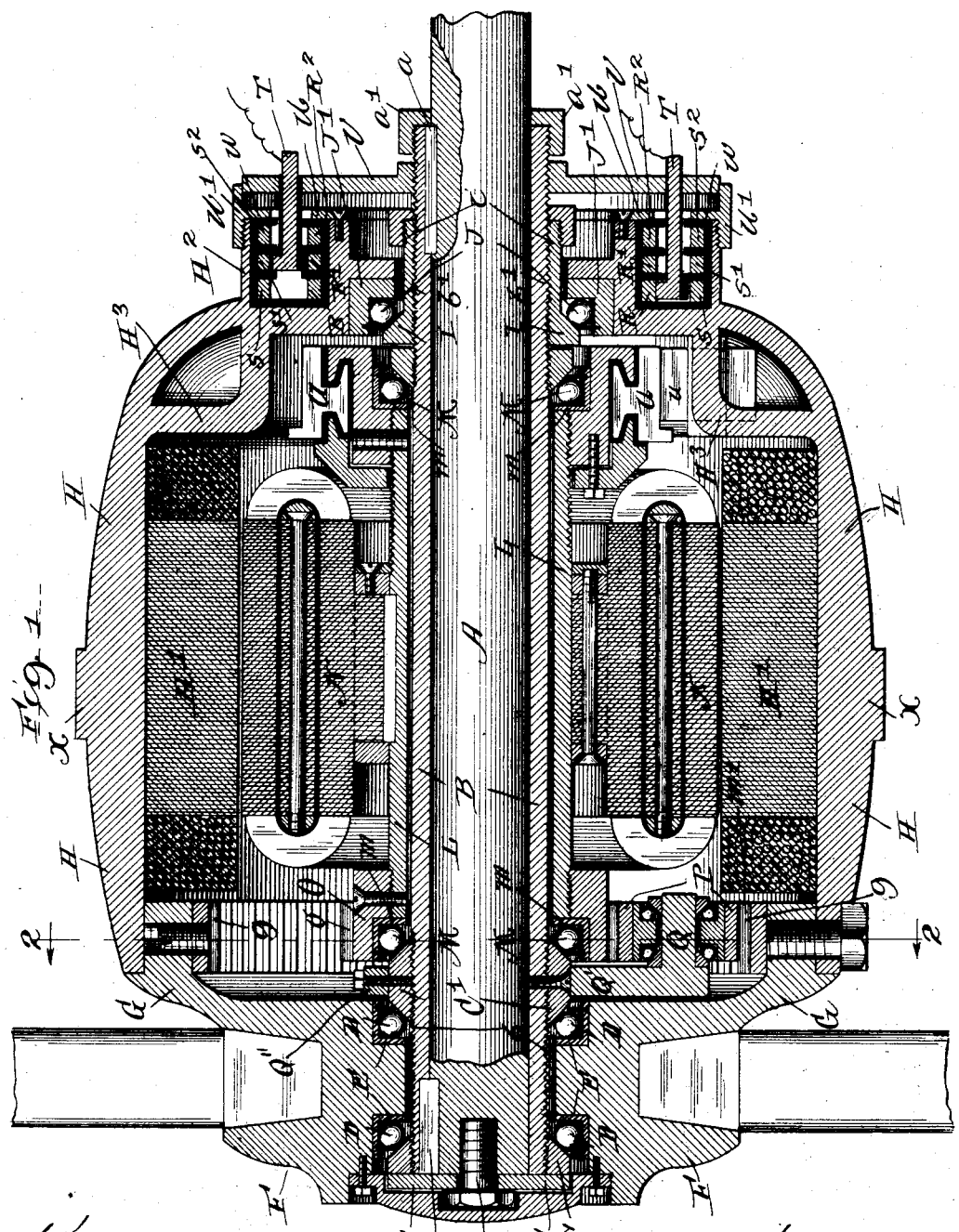

No. 682,898. Patented Sept. 17, 1901.
C. DE W. ANDERSON.
DYNAMO ELECTRIC MACHINE.
(Application filed Oct. 22, 1900.)
(No Model.) 2 Sheets—Sheet 1.

Witnesses: Inventor:
Charles DeWitt Anderson
By Hopkins
Attorney.

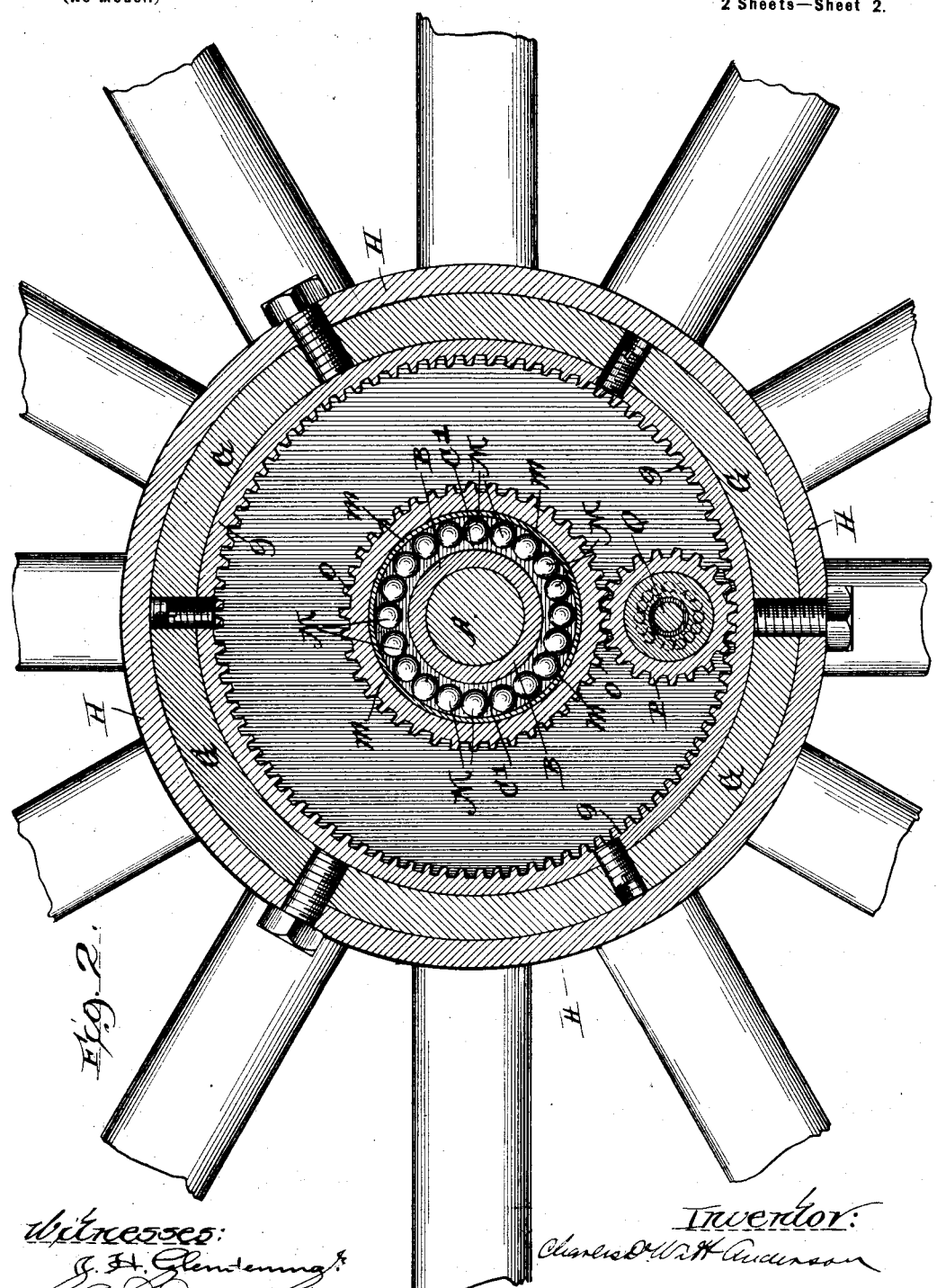

UNITED STATES PATENT OFFICE.

CHARLES DE WITT ANDERSON, OF CHICAGO, ILLINOIS.

DYNAMO-ELECTRIC MACHINE.

SPECIFICATION forming part of Letters Patent No. 682,898, dated September 17, 1901.

Application filed October 22, 1900. Serial No. 33,881. (No model.)

*To all whom it may concern:*

Be it known that I, CHARLES DE WITT ANDERSON, a citizen of the United States, residing at Chicago, in the county of Cook and State of Illinois, have invented certain new and useful Improvements in Dynamo-Electric Machines, of which the following is a specification.

The present invention relates principally to motors, and especially to that class of motors that are adapted for use on motor-vehicles; but some features of it are equally applicable to generators.

The principal object of the invention is to improve the construction of what are known in the art as "hub-motors," by which is meant a motor associated with the hub of the ground-wheel of a vehicle.

A minor object of the invention is to improve generally the construction of dynamo-electric machines of the broad class first above indicated.

To these ends the invention consists in the features of novelty that are herein described, and in order that it may be fully understood I will describe it with reference to the accompanying drawings, which are made a part of this specification, and in which—

Figure 1 is an axial section of a hub-motor embodying the invention. Fig. 2 is a transverse section thereof on the line 2 2, Fig. 1.

A represents the axle, and B a removable sleeve which surrounds the axle and is prevented from turning thereon by means of keys $a$, one of which is held in place by means of a flanged cap $a'$, screwed onto the inner end of the sleeve, and the other of which is held in place by a plate $a''$, secured to the end of the axle by means of a tap-bolt $A'$, which plate and bolt also prevent the longitudinal displacement of the sleeve. The outer portion of the sleeve is threaded exteriorly, as shown at $b$, and onto this threaded portion are turned rings C C', which form the inner races for anti-friction-balls D, the outer races E for said balls being carried by the hub F of the ground-wheel. The present invention is not concerned with the spokes and outer portion of the wheel, and these may therefore be of any desired construction.

One of the principal features of the invention consists in a hub having on its inner end within the plane of the spokes a flange G, to which the propelling power is applied and to which the casing H of the motor is secured. In hub-motors as heretofore constructed the spokes have been secured directly to the motor-casing approximately at its mid-length; but this is open to many objections, one of which is that the severe torsional strains to which the ground-wheel is subjected break and otherwise injure the motor-casing. Another objection is where the casing enters into the construction of the wheel and forms, in fact, its hub any injury to the wheel necessitating its removal necessitates also the removal of the casing. These objections are not, however, present in a hub-motor in which the wheel and its hub are separable from the balance of the casing. This arrangement relieves the casing of the strains to which the wheel is subjected, said strains being taken up by the wheel-bearing, and at the same time it enables the wheel to be removed either for the purpose of repairing it or for replacing it with one of different diameter without disturbing the casing or other parts of the motor proper.

At its inner end the sleeve B is threaded, as shown at $b'$, and onto this threaded portion is turned a ring I, on which is formed the inner race for the series of balls J, the outer race J' for said balls being secured within an annular rabbet in the inner end of the casing H. The ring I has a sleeve-like extension $i$, which projects through the opening in the inner end of the casing, and its projecting portion is made non-circular or provided with other suitable features for the reception of a wrench or other tool whereby it may be turned for the purpose of adjusting the ring I, and thereby adjusting the bearing.

L is a sleeve disposed within the casing H and rotatively mounted upon the sleeve B through the medium of antifriction-bearings M. This sleeve L is threaded at its ends, and on it an armature N is built or constructed in the manner shown and described in my application filed August 27, 1900, Serial No. 28,154.

Upon one end of the sleeve L is non-rotatively secured a ring O, having an annular rabbet for receiving the outer bearing ring or cup $m$ of the bearing M and having also a series of gear-teeth $o$, adapted to mesh with a gear-wheel P, which latter meshes also with a series of gear-teeth $g$, carried by the flange G. The gear-wheel P is supported through the medium of an antifriction-bearing by a stud Q, carried by an arm Q', non-rotatively mounted upon the axle A through the medium of a ring Q'' and the bearing-ring C', already referred to. As before described, the sleeve B is incapable of rotating relatively to the axle A, and the ring C when once adjusted to proper position is non-rotatively connected to the sleeve B by means of a pin or other suitable device, the ring Q'' being in turn non-rotatively secured to the ring C' by similar means. With this arrangement the sleeve L, carrying the armature N, and the casing H, carrying the field-magnets H', will be caused to rotate in opposite directions.

R R' $R^2$ are brush-rings, and S S' $S^2$ are brush-rings, all of which are disposed within an annular recess in an extension $H^2$ of the casing, the rings R R' $R^2$ being of smaller diameter and disposed within and opposite the rings S S' $S^2$, leaving between the two sets of rings an annular space for the entrance of the brushes T. These brushes may have contact with the outer faces of the rings R R' $R^2$ or with the inner faces of the rings S S' $S^2$, according to the course which it is desired the current shall take. The rings are coupled with the sections of the commutator U and with the coils of the field-magnets H'. The connections are not shown in the drawings, for the reason that they form no part of the present invention, and, furthermore, will vary according to the type of the machine. Suffice it to say that the connections between the rings and the appropriate field-magnet coils may be direct, since both the rings and the coils are carried by the casing, while the connection between the rings and the commutator-sections will be through the medium of properly-arranged brushes supported by bracket-arms $H^3$ on the interior of the casing, one of said brushes being shown at $u$. The stems of the brushes T are insulated and are supported by means of a disk V, carried by the sleeve B, the electrical connection with the source of electricity being made at the inner ends of the brush-stems.

In order to hold the brush-rings in place and close the annular space in which they are located, excepting for an annular opening sufficient to accommodate the stems of the brushes T, a ring W is secured to the inner extremity of the flange forming the inner wall of the chamber in which the rings are located and a sleeve W' is screwed onto the flange forming the outer wall of said chamber, said sleeve having an inwardly-presented flange $w$, which projects inward and partially closes the annular chamber aforesaid. The sleeve W' also projects beyond the plate V and is in close proximity to the periphery of said plate, whereby the brushes and their rings are inclosed and protected from dust and dirt. This arrangement of parts also prevents dust and dirt from entering the bearings.

The casing H is round in cross-section, and at about its mid-length it is provided with a cylindrical surface X for receiving the band of a brake.

Having described my invention, what I claim as new therein, and desire to secure by Letters Patent, is—

1. In a hub-motor, the combination with an axle and a wheel having a hub journaled upon the axle, of a motor having a casing surrounding and journaled upon the axle, the outer end of the casing being attached to the wheel, substantially as set forth.

2. A hub-motor having an axle and a wheel having a hub journaled on the axle, in combination with a motor having a casing surrounding and journaled upon the axle, and means for detachably connecting the outer end of the casing and the wheel, substantially as set forth.

3. A hub-motor having an axle and a wheel having a hub journaled upon the axle, said hub having at its inner end an annular flange, in combination with a casing surrounding and journaled upon the axle, and means for detachably connecting the outer end of the casing to the flange of the hub, substantially as set forth.

4. A hub-motor having an axle and a wheel having a hub journaled upon the axle and having at its inner end a flange, in combination with a casing surrounding and journaled upon the axle and having its outer end detachably secured to the flange aforesaid, which latter and the hub form the outer end of the casing, substantially as set forth.

5. In a hub-motor, the combination of an axle, a removable sleeve surrounding it, means for preventing the relative rotation of the axle and sleeve, a wheel having a hub journaled upon the sleeve, and a motor having a casing journaled upon the sleeve, whereby the entire motor and wheel may be removed with the sleeve, substantially as set forth.

6. A hub-motor having, in combination, an axle, a sleeve surrounding the axle, means for preventing the relative rotation of the axle and sleeve, a wheel having a hub journaled upon the sleeve, a motor having a casing journaled upon the sleeve and having its outer end detachably connected to the wheel, whereby the wheel may be removed without removing the casing, a second sleeve journaled upon the first and removable independently thereof, and an armature carried by the second sleeve, other parts of the motor being carried by the sleeve first aforesaid, substantially as set forth.

7. In a dynamo-electric machine, the combination of a revoluble casing, a plurality of brush-rings arranged concentrically and with an annular space between them, means for insulating said rings, and brushes occupying the annular space aforesaid and having contact with the rings, substantially as set forth.

8. In a dynamo-electric machine, the combination of a revoluble casing having an annular recess, a plurality of brush-rings arranged in said recess, one within another, with an annular space between them, brushes projecting into said annular space and having contact with the rings, a disk by which the brushes are supported, and a flange carried by the casing and projecting over the periphery of the disk, substantially as set forth.

CHARLES DE WITT ANDERSON.

Witnesses:
L. M. HOPKINS,
J. H. LEWIS.